May 28, 1968     V. L. HEETER     3,384,997
FRICTION RETAINER FOR A PIVOTAL WINDOW
Filed April 14, 1966
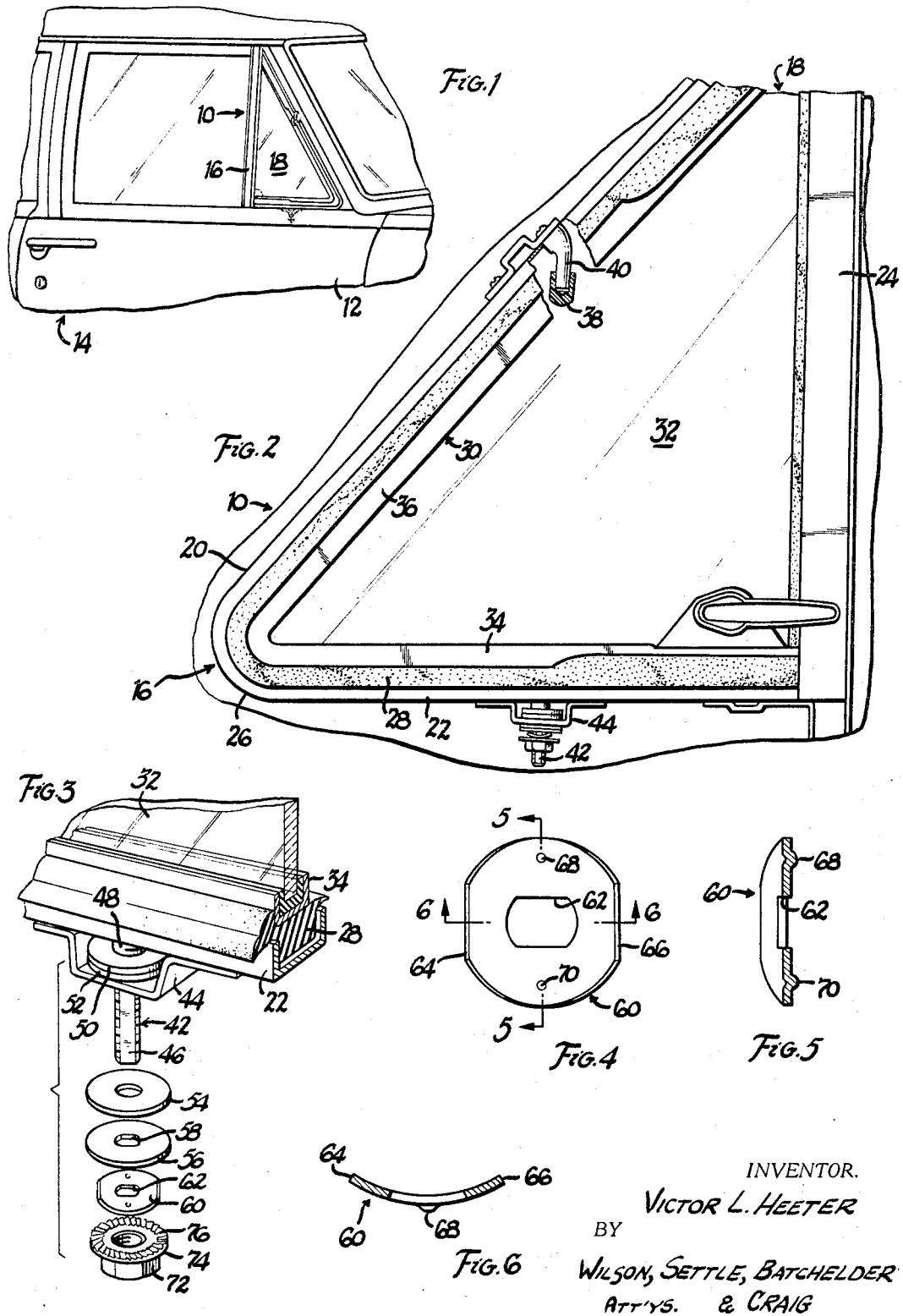
INVENTOR.
VICTOR L. HEETER
BY
WILSON, SETTLE, BATCHELDER
ATT'YS.   & CRAIG United States Patent Office 3,384,997
Patented May 28, 1968

3,384,997
FRICTION RETAINER FOR A
PIVOTAL WINDOW
Victor L. Heeter, Elkhart, Ind., assignor to Excel Corporation, Elkhart, Ind., a corporation of Indiana
Filed Apr. 14, 1966, Ser. No. 542,513
3 Claims. (Cl. 49—391)

ABSTRACT OF THE DISCLOSURE

A pivotal vehicle window sash in combination with an assembly for the pivotal mounting thereof is illustrated. The vehicle window sash includes the usual frame and sash elements along with means for pivotally mounting the sash in the frame. The means for pivotally mounting the sash includes a generally cylindrical threaded stud which extends from the sash through an opening in the frame. The stud has at least one flattened face. A bowed spring washer is received on the stud. The bowed washer has an opening which mates with the periphery of the stud to thereby prevent relative rotation of the bowed washer and stud. A friction washer is provided on each side of the frame to permit relative movement of the stud with respect to the frame.

The friction washer means are rotatable with respect to the stud. The concave surface of the bowed washer faces the frame. A metal washer is provided between the bowed washer and the friction washer. The bowed washer has a pair of diametrically opposed peripheral flats for engagement with the metal washer, the metal washer being fabricated preferably of a soft metal. Projecting means are provided on the convex surface of the bowed washer. A nut is threadedly received on the stud in abutting relationship with the bowed washer in pressure engagement therewith causing the bowed washer to exert a spring pressure to restrain pivoting of the sash in the frame. Serrations are provided on the nut and engage the projecting means on the bowed washer to lock the nut in place.

Background of the invention

Conventionally, vehicle vent window constructions comprise a frame in which is pivotally mounted the vent window sash, the sash being pivoted to open or closed position either by hand pressure or by means of a crank. The pivotal attachment of the sash to the frame generally comprises a stud which extends downwardly from the sash framing element through the bottom window frame element and through a bracket mounted on the underside of the frame element. The lower end of the stud is threaded and receives a nut. A coil spring is positioned between the nut and bracket. The nut may be threaded in or out to adjust the pressure of the spring and thus control the ease of pivoting the sash.

The present invention forms an improvement over such conventional structures in that the coil spring is eliminated by means of a bowed washer which serves the same function but which reduces the manufacturing cost of the entire assembly.

Summary of the invention

The invention is directed toward a window construction which comprises a frame and a sash. Means are provided for pivotally mounting the sash in the frame. These means comprise a generally cylindrical threaded stud which extends from the sash through an opening in the frame. The frame has a bracket on the underside thereof. The bracket has an opening through which the stud extends. The stud has at least one flattened surface portion thereon.

A bowed spring washer having an opening therethrough is received on the stud on the underside of the bracket. The opening in the bowed washer mates with the stud to prevent relative rotational movement of the parts. The bowed washer is received on the stud in a position with the concave surface extending towards the bracket. A pair of friction washers are received on the stud. These washers are received on opposite sides of the bracket. Each of the friction washers has a generally cylindrical opening for rotation on the stud.

A nut is threadedly received on the stud. Projecting means are provided on the convex surface of the bowed washer. The nut has serrations which abut against the bowed washer. These serrations engage the projecting means on the washer after the nut has been threaded into pressure engagement with the washer to thereby lock the nut in place.

A metal washer is provided between the bowed washer and the adjacent friction washer. The peripheral portion of the bowed washer adjacent the metal washer defines elongated edges which slidably engage the metal washer to deform the bowed washer and force the metal washer into pressure contact with the friction washer.

It is therefore an object of this invention to provide an assembly for the pivotal mounting of a vehicle vent window in which the conventional coil spring is replaced by a simple bowed washer.

Another object of the invention is to provide component elements including a soft washer and a serrated nut for use in connection with the bowed washer to facilitate use of such a washer.

A further object of the invention is to provide a stud structure having flats on opposing sides thereof to mate with rectangular openings in the bowed washer and soft metal washer to hold these elements against relative movement with respect to the stud during pivoting of the sash.

Another object of the invention is to provide friction washers on either side of a bracket upon which the pivotal assembly is mounted to permit relative movement of the stud with respect to the bracket without damaging the bowed washer assembly.

Other objects of this invention will appear in the following description and appended claims, reference being had to the accompanying drawings forming a part of this specification wherein like reference characters designate corresponding parts in the several views.

In the drawings:

FIGURE 1 is a view in perspective of a vehicle vent window mounted in the door of a vehicle illustrating one embodiment of the pivotal mounting structure of the present invention;

FIGURE 2 is an elevational view on an enlarged scale of the vent window assembly of FIGURE 1;

FIGURE 3 is an exploded view in perspective of the pivotal mounting assembly of the vent window on an enlarged scale;

FIGURE 4 is a planned view of the top surface of the bowed washer;

FIGURE 5 is a sectional view taken substantially along the line 5—5 of FIGURE 4 looking in the direction of the arrows; and FIGURE 6 is a sectional view of the bowed washer taken substantially along the line 6—6 of FIGURE 4 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be noted that a vent window construction 10 is mounted on the forward portion of a vehicle door 12 of an automobile 14. The vent window construction 10 includes a window frame 16 in which is pivotally mounted the window sash 18. The window frame and sash have the ordinary triangular shape usually associated with vehicle vent windows. The window frame 16 may be mounted in the forward portion of the vehicle front door as shown or other portion of the vehicle as is conventional.

Referring to FIGURE 2, the frame 16 comprises three channel elements 20, 22, 24 secured together in triangular fashion. The forward frame element 20 extends upwardly and rearwardly at an angle from the forward end of the bottom frame element 22. The frame elements 20, 22 are illustrated as a continuous channel member bent at 26 to define a V-shaped configuration. The forward and bottom frame elements 20, 22 are secured at their rearward ends to a vertical rear frame element 24 to complete the frame assembly.

A weatherstrip 28 is received in the channel defined by the frame elements 20, 22 to seal the window construction in the closed position. The weatherstrip 28 may be fabricated of rubber or other suitable material.

The window sash 18 comprises a channel framing element 30 which receives triangular window pane 32, the sash construction being sized to be snugly received in the window frame 16 when the window is closed.

The framing element 30 comprises a first horizontal element 34 which receives the bottom edge of the plane 32 and an upwardly and rearwardly extending portion 36 which receives the forward edge of the pane 32.

The sash 18 is pivotally mounted in the frame 16 at two places. A bracket 38 is provided on the window sash 18 on the forward framing element 36 thereof intermediate the upper and lower ends thereof. The bracket 38 pivotally receives a stud 40 which is fixedly mounted to the window frame 16 adjacent the forward frame element 20.

The second pivotal attachment of the sash to the frame, and the feature of the vent window with which the present invention is primarily concerned, comprises a stud 42 which extends downwardly from the window sash 18 horizontal element 34 of frame 30 through the bottom window frame element 22 and through a bracket 44 mounted on the underside of the frame element 22. The stud 42 is threaded and has a flat 46 on each opposing side thereof as shown in FIGURE 3.

Referring to FIGURE 3, the upper end of the stud is enlarged at 48. A pair of washers 50, 52 are received between the enlarged portion 48 and the bracket 44. The washer 50 is metallic and has a rectangular central opening mating with the configuration of the stud to prevent rotation thereof relative to the stud. The lower washer 52 is fabricated from a soft material, such as graphite impregnated canvas, which will cause some frictional drag. The washer 52 has a circular opening therethrough to permit relative movement thereof with respect to the stud 42.

A second friction washer 54 is provided on the underside of the bracket 44 on the stud 42. The washers 52, 54 permit pivoting of the sash without excessive drag. A metal washer 56 is provided beneath the washer 54. It will be noted that the washer 56 has a generally rectangular central opening 58 to prevent relative movement thereof with respect to the stud 42.

A bowed washer 60 is provided beneath the metal washer 56. It will be noted that the bowed washer 60 also has a generally rectangular central opening 62 to prevent relative motion with respect to the stud 42.

Referring to FIGURES 4, 5 and 6, it will be noted that the washer 60 is bowed along the longitudinal axis of the opening 62. The washer 60 is provided with a pair of diametrically opposed peripheral flats 64, 66. It will be noted that the flats 64, 66 are provided on what may be termed the most outwardly bowed portion of the washer. This permits the edges of the flats to contact the metal washer 56 and provide relatively free movement of the bowed washer 62 with metal washer 56 and exert an even pressure against the washer 54.

A pair of diametrically opposed projections 68, 70 are provided on the undersurface of the bowed washer. These projections are provided on what may be termed the least bowed portion of the washer to permit engagement thereof with a nut 72 which completes the assembly. It will be noted that the nut 72 has a peripheral flange 74 on the underside thereof. The flange 74 is serrated at 76, the serrations being angled oppositely to the direction of rotation of threading the nut onto the stud 42 to permit the serrations to move over the projections 68, 70 when the nut is being threaded onto the stud but to prevent reverse movement after the assembly has been completed. While angled serrations are preferred, straight V serrations may be used. Consequently, when the entire structure is threaded together, the nut is locked in place and will not unthread as the window is pivoted. The serrations also permit incremental adjustment of the bowed washer 60 at any time during use of the window assembly to obtain the precise resistance to pivoting desired.

The bowed washer 60 is fabricated of a springy metal so that it will exert a spring pressure when it is deformed by the nut 72. This washer thus replaces the usual coil spring provided in vent window constructions. The bowed washer 60 also provides for locking the nut 72 by virtue of the projections 68 and 70 engaging the nut 72.

In operation, the nut 72 is threaded onto the stud 42 with the other elements in place and adjusted until the washer 60 is deformed sufficiently to exert the desired pressure and thus control the ease of pivoting the sash 18. It is desired that the sash be neither too loose nor too tight. When the sash is pivoted, the washers 50, 56, 60 and nut 72 will move with the stud 42. However, the washers 52, 54 are free to move independently of the stud 42. The design also provides for maintenance adjustments for wear during the operating life of the assembly.

Having thus described my invention I claim:

1. In a window construction comprising a frame and a sash, means for piotally mounting the sash in the frame comprising a generally cylindrical threaded stud extending from the sash through an opening in the frame, said frame having a bracket on the underside thereof, said bracket including an opening through which the stud extends, said stud having at least one flattened surface portion thereon, a bowed spring washer having an opening therethrough received on the stud on the underside of the bracket, the configuration of the opening in said bowed washer mating with the periphery of the stud to prevent relative rotational movement with respect thereto, said bowed washer being received on the stud in a position with the concave surface thereof extending toward the bracket, a pair of friction washers received on the stud, each of said friction washers being received on an opposite side of the bracket, each of said friction washers having a generally cylindrical opening therethrough to be relatively rotatable with respect to the stud, a nut threadingly received on the stud, projecting means on the convex surface of the bowed washer, serrations on the surface of the nut which abuts against the bowed washer, said serrations engaging the projecting means after the nut has been threaded into pressure engagement with the bowed washer to thereby lock the nut in place, and a metal washer between the bowed washer and the adjacent friction washer, the peripheral portions of the bowed washer adjacent the metal washer defining elongated edges, the elongated edges of the bowed washer slidably engaging the metal washer to deform the bowed washer and force the metal washer into pressure contact with the friction washer.

2. In a window construction comprising a frame and a sash, means for pivotally mounting the sash in the frame comprising a generally cylindrical threaded stud extending from the sash through an opening in the frame, said stud having at least one flattened surface portion thereon, a bowed spring washer having an opening therethrough received on the stud in a position with the concave surface thereof extending toward the frame, the configuration of the opening in said bowed washer mating with the periphery of the stud to prevent relative rotational movement with respect thereto, friction washer means between the bowed washer and the frame, said friction washer means being rotatable with respect to the stud, a nut threadedly received on the stud, said nut abutting against the bowed washer in pressure engagement therewith causing said washer to exert a spring pressure against the friction washer means to restrain pivoting of the sash in the frame, projecting means on the convex surface of the bowed washer, and serrations on the surface of the nut which abut against the bowed washer, said serrations engaging the projecting means after the nut has been threaded into pressure engagement with the bowed washers to thereby lock the nut in place.

3. In a window construction comprising a frame and a sash, means for pivotally mounting the sash in the frame comprising a generally cylindrical threaded stud extending from the sash through an opening in the frame, said stud having at least one flattened surface portion thereon, a bowed spring washer having an opening therethrough received on the stud in a position with the concave surface thereof extending toward the frame, the configuration of the opening in said bowed washer mating with the periphery of the stud to prevent relative rotational movement with respect thereto, friction washer means between the bowed washer and the frame, said friction washer means being rotatable with respect to the stud, a nut threadedly received on the stud, said nut abutting against the bowed washer in pressure engagement therewith causing said washer to exert a spring pressure against the friction washer means to restrain pivoting of the sash in the frame, the peripheral portions of the bowed washer closest to the frame defining straight edges, said friction washer means comprising a soft metal washer adjacent to the bowed washer, and a friction washer between the soft metal washer and the frame, said friction washer having a generally cylindrical opening therethrough to be relatively rotatable with respect to the stud, the straight edges of the bowed washer slidably engaging the soft metal washer to deform the bowed washer and force the soft metal washer into pressure contact with the friction washer.

References Cited
UNITED STATES PATENTS

| | | | |
|---|---|---|---|
| 1,896,057 | 1/1933 | Sheard | 49—393 XR |
| 2,698,958 | 1/1955 | Adams | 49—391 XR |
| 3,052,497 | 9/1962 | Lohr | 49—391 |

KENNETH DOWNEY, *Primary Examiner.*